US007543656B2

(12) United States Patent
Dorval

(10) Patent No.: US 7,543,656 B2
(45) Date of Patent: Jun. 9, 2009

(54) BREATHING FOR SINGLE ACTING HYDRAULIC CYLINDERS

(75) Inventor: Denis Dorval, Armadale (AU)

(73) Assignee: Bourgault Industries Ltd., St. Brieux, Saskatchewan (CA)

( * ) Notice: Subject to any disclaimer, the term of this patent is extended or adjusted under 35 U.S.C. 154(b) by 0 days.

(21) Appl. No.: 11/686,520

(22) Filed: Mar. 15, 2007

(65) Prior Publication Data

US 2007/0221055 A1 Sep. 27, 2007

(30) Foreign Application Priority Data

Mar. 27, 2006 (AU) .............................. 2006201243

(51) Int. Cl.

| | |
|---|---|
| ***A01B 61/04*** | (2006.01) |
| ***F01B 1/02*** | (2006.01) |
| ***F01B 29/00*** | (2006.01) |
| ***F01B 31/00*** | (2006.01) |
| ***F16J 15/18*** | (2006.01) |

(52) U.S. Cl. .......................... 172/260.5; 60/261; 92/61; 92/142; 92/161; 92/165 R; 92/261

(58) Field of Classification Search ................... 60/261, 60/163, 164, 145, 142; 172/260.5; 92/61, 92/142, 153-161, 161.5, 165 R, 166-168, 92/165 PR, 261

See application file for complete search history.

(56) References Cited

U.S. PATENT DOCUMENTS 4,505,337 A * 3/1985 Ryan ....................... 172/260.5

FOREIGN PATENT DOCUMENTS

| | | |
|---|---|---|
| DE | 3329832 | 2/1985 |
| DE | 263017 | 12/1988 |
| FR | 2343186 | 9/1977 |
| RU | 2 267 889 C1 | 1/2006 |

* cited by examiner

*Primary Examiner*—Christopher J. Novosad
(74) *Attorney, Agent, or Firm*—Frost Brown Todd LLC

(57) ABSTRACT

A single acting hydraulic cylinder apparatus includes a mechanism operated by a single acting hydraulic cylinder, the mechanism including a hollow member. A breathing chamber is provided by sealing at least a portion of the hollow member such that outside air is prevented from entering the breathing chamber. A pressurized port of the hydraulic cylinder is adapted for connection to a pressurized hydraulic fluid source, and an un-pressurized breathing port of the hydraulic cylinder is connected to the breathing chamber such that air can flow between the breathing port and the breathing chamber.

5 Claims, 2 Drawing Sheets

BREATHING FOR SINGLE ACTING HYDRAULIC CYLINDERS

This invention relates to hydraulic cylinders and in particular to a breather for a single acting hydraulic cylinder.

PRIORITY INFORMATION

This application claims priority to Australian Patent Application Serial No. 2006201243, filed Mar. 27, 2006.

BACKGROUND OF THE INVENTION

Extendable hydraulic cylinders are commonly used in a variety of mechanisms in a wide variety of equipment applications. These cylinders typically comprise a cylindrical barrel with a piston sealed inside the barrel. A shaft is attached to the piston and sealed to the barrel and typically extends from one end of the barrel, although hydraulic cylinders are also configured with a shaft extending from both ends of the barrel. A port is provided in each end of the barrel, and pressurized hydraulic fluid is directed through the ports to move the piston and extend or retract the shaft.

In a double acting hydraulic cylinder, the barrel is full of oil on each side of the piston, and hydraulic fluid conduits are connected to both ports. Valves connect a pressurized hydraulic fluid source to the double acting cylinder such that hydraulic fluid can be directed into the first port to move the piston toward the second port, and hydraulic fluid on the second side of the piston is pushed out through the second port, and vice versa. The shaft extends or retracts with the movement of the piston. Such double acting cylinders exert force when extending or retracting.

Single acting hydraulic cylinders are used where force is required to be exerted in one direction only. For example hydraulic cylinders are often used on mechanisms used to raise or lower an object. A single acting cylinder can be used to exert a force in one direction only, either extending or retracting, to raise the object by operating a valve to direct pressurized hydraulic fluid through a pressurized port of the cylinder. Hydraulic fluid enters the barrel on the raising side of the piston and pushes the piston in a raising direction. When it is desired to lower the object, the valve is operated to release the hydraulic fluid from the barrel on the raising side of the piston, and the weight of the object forces the hydraulic fluid out through the pressurized port and the object moves down until the valve is operated to stop the fluid flow out of the pressurized port.

Similarly, in trip mechanisms on agricultural implements single acting hydraulic cylinders are used to exert a force in one direction only to maintain a ground engaging tool in a working position. The hydraulic cylinder typically forces a pivoting shank against a stop that is configured such that a ground engaging tool attached to the bottom of the shank is in a desired maximum downward and forward working position when the shank bears against the stop. An active hydraulic source directs hydraulic fluid at a constant pressure through the pressurized port such that the piston and shaft exert a substantially constant bias force on the shank.

The bias force exerted is sufficient to maintain the shank against the stop and the ground engaging tool in the working position during normal operations passing through the ground. When the tool encounters an obstruction, such as a rock, and the rearward and upward force on the tool increases to a level greater than that exerted by the hydraulic cylinder, the ground engaging tool moves upward and rearward against the bias force to clear the obstruction. Once clear, the bias force exerted by the hydraulic cylinder is sufficient to move the shank and attached ground engaging tool back down into the working position.

Thus in single acting hydraulic cylinders, only the end of the barrel on the pressurized port side of the piston contains hydraulic fluid. The opposite un-pressurized end of the barrel contains only air. If the un-pressurized end is sealed the air will expand and compress according to the position of the piston, exerting additional forces on the piston and adversely affecting the desired operation of the hydraulic cylinder. A breather is therefore provided that allows air to enter or leave the un-pressurized end of the barrel as the piston moves back and forth in the barrel. Such breathers typically are screwed into a port on the un-pressurized end of the barrel, and provide a screen through which air passes into and out of the barrel.

Problems arise with conventional breathers in that fine screens can often plug up such that air will not pass through them as required for proper operation, while coarser screens can allow dust to enter the barrel and damage the walls and seals of the hydraulic cylinder. As well moisture can condense in, or be drawn into, the barrel, especially when operating in humid conditions or rain, causing rust and corrosion and premature failure of the cylinder.

SUMMARY OF THE INVENTION

It is an object of the present invention to provide a method of operating a single acting hydraulic cylinder and a single acting hydraulic cylinder apparatus that overcome problems in the prior art.

In a first embodiment the invention provides a method of operating a single acting hydraulic cylinder. The hydraulic cylinder has a pressurized port connected to a source of pressurized hydraulic fluid, and a breathing port, and the hydraulic cylinder is mounted on a mechanism that includes a hollow member. The method comprises providing a breathing chamber by sealing at least a portion of the hollow member such that outside air is prevented from entering the breathing chamber, and operatively connecting the breathing port of the hydraulic cylinder to the breathing chamber such that as a piston of the hydraulic cylinder moves with respect to a barrel of the hydraulic cylinder in response to pressurized hydraulic fluid entering and exiting the pressurized port, air moves through the breathing port into and out of the breathing chamber.

In a second embodiment the invention provides a single acting hydraulic cylinder apparatus comprising a mechanism operated by a single acting hydraulic cylinder, the mechanism including a hollow member. A breathing chamber is provided by sealing at least a portion of the hollow member such that outside air is prevented from entering the breathing chamber. A pressurized port of the hydraulic cylinder is adapted for connection to a pressurized hydraulic fluid source, and an un-pressurized breathing port of the hydraulic cylinder is connected to the breathing chamber such that air can flow between the breathing port and the breathing chamber.

The invention thus prevents the entry of outside air carrying dust, moisture, and like harmful substances into the interior of the un-pressurized end of the hydraulic cylinder by connecting the breathing port of the hydraulic cylinder to a sealed breathing chamber such that a constant body of clean air flows in and out of the breathing chamber as the cylinder piston moves back and forth. The breathing chamber can be selected and sized to reduce the pressure variations in the un-pressurized end of the cylinder to acceptable levels. Rather than providing a separate element, the invention utilizes existing hollow members such as are found in tubing frames and the like on many mechanisms where such single acting hydraulic cylinders are used.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 2:
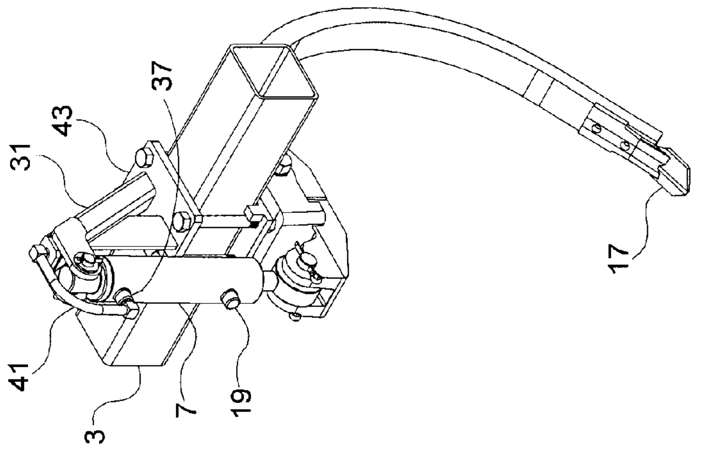
FIG. 2 is a perspective view of the embodiment of FIG. 1.
Figure 1:
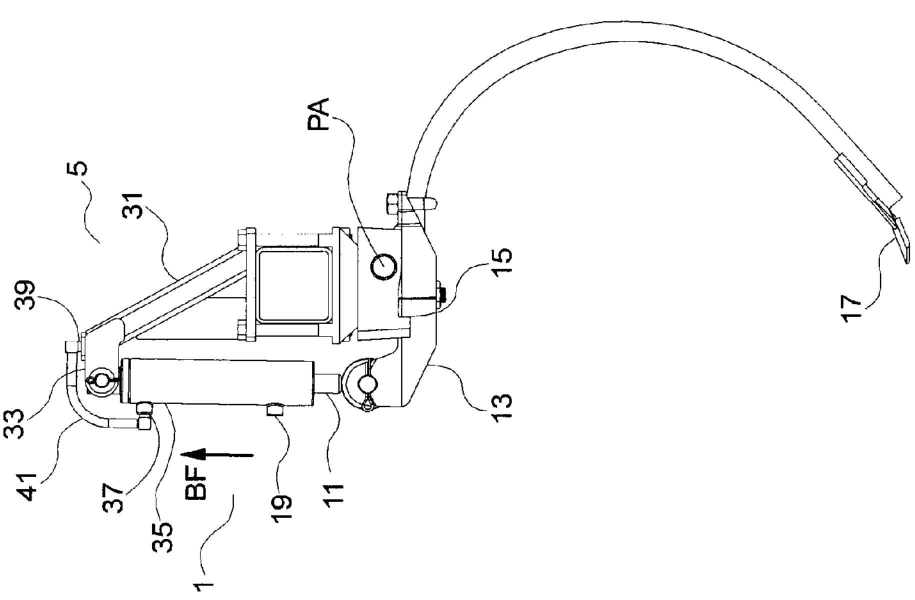
FIG. 1 is a side view of an embodiment of the present invention in use on an agricultural implement.

FIGS. 1 and 2 illustrate single acting hydraulic cylinder apparatus 1 of the invention. The apparatus 1 comprises a mechanism, illustrated as an agricultural implement frame 3 with a shank trip assembly 5 mounted on the frame 3. A single acting hydraulic cylinder 7 exerts a bias force BF to maintain a ground engaging tool 17 in a working position. The hydraulic cylinder shaft 11 is attached to the front end of a pivoting shank 13, ahead of the pivot axis PA of the shank 13. The bias force BF exerted upward on the front end of the shank 13 forces the shank 13 against a stop 15 that is configured such that a ground engaging tool 17 attached to the bottom of the shank 13 is in a desired maximum downward and forward working position when the shank 13 bears against the stop 15.

Figure 3:
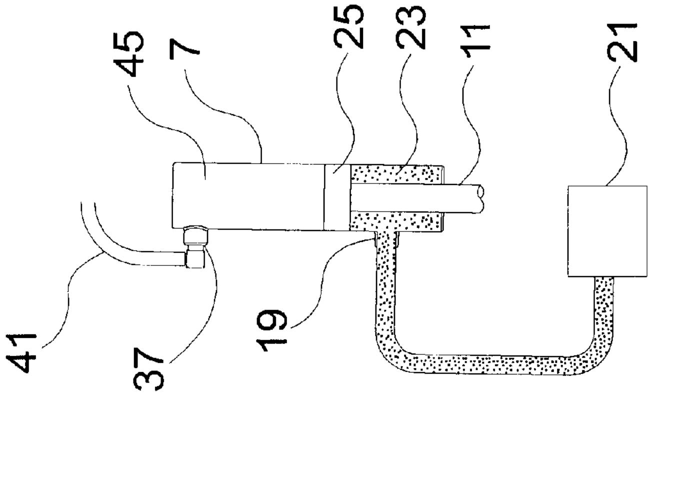
FIG. 3 is a schematic view of the hydraulic cylinder of the embodiment of FIG. 1.

As illustrated schematically in FIG. 3, an active hydraulic source 21 directs hydraulic fluid 23 at a constant pressure through a pressurized port 19 of the hydraulic cylinder 7 such that the piston 25 and shaft 11 attached thereto exert the bias force BF on the shank 13.

The trip assembly 5 comprises a sealed tube 31 extending upward from the frame 3 and the barrel 35 of the hydraulic cylinder 7 is pivotally attached to a support arm 33 at the top end of the sealed tube 31 such that the breathing port 37 of the hydraulic cylinder 7 is adjacent to the top end of the sealed tube 31. In the illustrated configuration, the hydraulic cylinder 7 is mounted in the trip assembly 5 such that pressurized hydraulic fluid 23 entering the pressurized port 19 of the hydraulic cylinder 7 moves the shaft 11 of toward a retracted position. Thus when the ground engaging tool 17 is in the normal working position illustrated, the shaft 11 is retracted and protected from moisture and exposure to the elements which can damage the shaft 11 and impair operation of the hydraulic cylinder 7.

In the illustrated embodiment of the invention the sealed tube 31, which is an integral part of the trip assembly 5 of the implement mechanism, provides a sealed breathing chamber where outside air is prevented from entering. The bottom end of the tube 31 is welded to a plate 43 attached to the frame 3, and a plate has been welded to the top end of the tube. A chamber port 39 is defined in the plate at the top end of the sealed tube 31 and the breathing port 37 of the hydraulic cylinder 7 is connected to the chamber port 39 by a conduit 41 such that air can flow between the inside of the barrel 35 on the un-pressurized side 45 of the piston 25 of the hydraulic cylinder 7 and the breathing chamber provided by the interior of the sealed tube 31.

Figure 4:
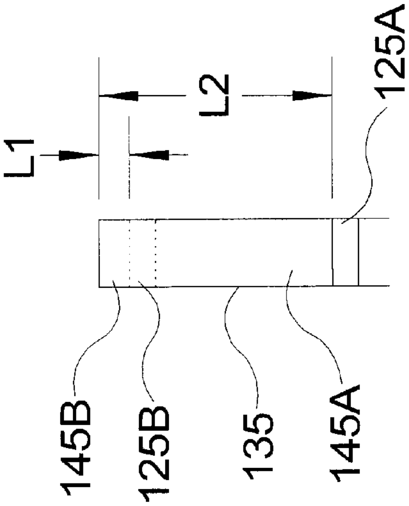
FIG. 4 is a schematic view of the operation of a single acting hydraulic cylinder with the un-pressurized end of the barrel thereof sealed.

In single acting hydraulic cylinders such as that illustrated in FIGS. 1-3, only the end of the barrel 35 on the pressurized port side of the piston 25 contains hydraulic fluid 23. The opposite un-pressurized end of the barrel 45 contains only air. If the un-pressurized end 45 is sealed, the air will expand and compress according to the position of the piston 25, exerting additional forces on the piston 25 and adversely affecting the desired operation of the hydraulic cylinder 7. The degree of expansion and compression of the air will depend on the ratio between the volumes of the un-pressurized side 45 of the barrel when the piston 25 is at one end of the stroke or the other. As schematically illustrated in the sealed barrel 135 of FIG. 4, where the piston moves from position 125A to 125B the volume of the un-pressurized area is reduced from volume 145A to volume 145B. Where for example L2 is five times L1, the pressure in volume 45B will be 5 times the pressure in volume 145A.

A breather is therefore conventionally provided that allows air to enter or leave the un-pressurized end 145 of the barrel 135 as the piston moves back and forth. Such breathers typically are screwed into a breather port and provide a screen through which air passes into and out of the un-pressurized end 145 of the barrel. Such breather screens are sometimes too fine and plug up such that air will not pass through them as required for proper operation, while coarser screens can allow dust to enter the barrel and damage the walls and seals of the hydraulic cylinder. As well moisture can condense in the barrel, especially when operating in humid conditions or rain, causing rust and corrosion and premature failure of the cylinder.

Figure 5:
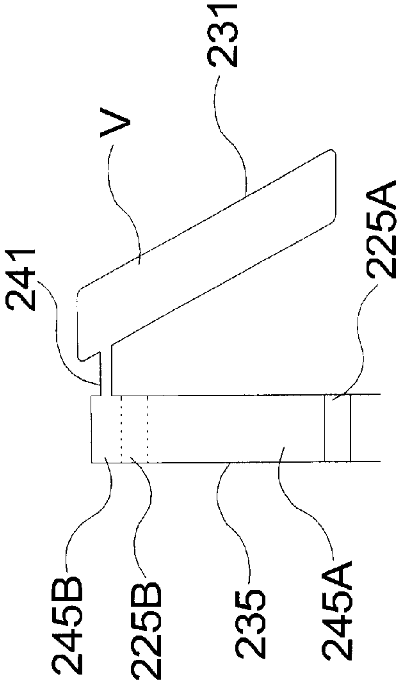
FIG. 5 is a schematic view of the operation of a single acting hydraulic cylinder with the un-pressurized end of the barrel thereof connected to a breathing chamber provided by sealing a portion of a hollow member of whatever mechanism the cylinder is attached to and/or activating.

In the apparatus of the present invention, schematically illustrated in FIG. 5, outside air is excluded and the volume of the un-pressurized area is significantly increased to include the volume of the breathing conduit 241 and the volume V of the breathing chamber provided by the interior of the sealed tube 231. Thus where the piston moves from position 225A to 225B the volume of the un-pressurized area is reduced from volume 245A+V to volume 245B+V. Where for example the volume V is about the same as volume 245A, movement of the piston from position 225A to position 225B will only increase the pressure P to about twice the pressure P at position 225A. As the piston 225 moves up and down the pressure in the un-pressurized area varies between P and 2P, which for many single acting hydraulic cylinder applications will not interfere with proper operation of the apparatus.

Outside air with its associated dust and moisture then can not enter the un-pressurized side 45 of the hydraulic cylinder 7, and provided the air in the un-pressurized side 45 of the piston 25, breathing conduit 41, and sealed tube 31 is clean and dry when the apparatus 1 is assembled, contamination and subsequent damage to the hydraulic cylinder 7 is substantially prevented.

In practice with a single acting hydraulic cylinder apparatus 1 configured as illustrated in FIG. 1, it is contemplated that air will be bled out of the breathing conduit 41 and sealed tube 31 and the un-pressurized side of the barrel 35 when in the illustrated position of FIG. 1 such that the pressure therein is atmospheric at that position, which is the normal operating position. When the shaft 11 extends to allow the shank 13 to trip, a vacuum will be produced in the un-pressurized side of the piston 25 and in the sealed tube 31, but when the shank returns to the operating position, the pressure will again be atmospheric.

Where it is desired to reduce the pressure variation further, the breathing chamber can be provided by sealing a larger hollow member of the mechanism being operated. For example a section of the frame 3 could be sealed and connected to the breathing port 37 to provide the breathing chamber instead of the smaller tube 31. A plurality of single acting hydraulic cylinders could also be connected to the same breathing chamber. While the invention is illustrated in use on an agricultural implement, hollow members are commonly available on frames and like elements of other mechanisms that use a single acting hydraulic cylinder. By sealing off a portion of such a hollow member, a similar breathing chamber can be provided for connection to the un-pressurized side of any similar hydraulic cylinder.

The invention thus provides a method of operating a single acting hydraulic cylinder, comprising providing a breathing chamber by sealing at least a portion of a hollow member of a mechanism to which the hydraulic cylinder is attached such that outside air is prevented from entering the breathing chamber, and operatively connecting the breathing port of the hydraulic cylinder to the breathing chamber such that as a piston of the hydraulic cylinder moves with respect to a barrel of the hydraulic cylinder in response to pressurized hydraulic fluid entering and exiting the pressurized port, air moves through the breathing port into and out of the breathing chamber.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A single acting hydraulic cylinder apparatus comprising:

an agricultural implement with at least one ground engaging tool shank connected to a trip assembly operated by a single acting hydraulic cylinder, wherein a hollow member is provided by the trip assembly;

a breathing chamber provided by sealing at least a portion of the hollow member such that outside air is prevented from entering the breathing chamber;

a pressurized port of the hydraulic cylinder adapted for connection to a pressurized hydraulic fluid source;

an un-pressurized breathing port of the hydraulic cylinder connected to the breathing chamber such that air can flow between the breathing port and the breathing chamber.

2. The apparatus of claim 1 wherein the trip assembly comprises a sealed tube, and wherein the breathing chamber is provided by the sealed tube.

3. The apparatus of claim 2 wherein the hydraulic cylinder is mounted in the trip assembly such that pressurized hydraulic fluid entering the pressurized port of the hydraulic cylinder moves a shaft of the hydraulic cylinder toward a retracted position.

4. The apparatus of claim 3 wherein the sealed tube extends upward from a frame of the implement, and wherein a barrel of the hydraulic cylinder is pivotally attached to a support at a top end of the sealed tube such that the breathing port is adjacent to the top end of the sealed tube, and wherein the chamber port is defined in an upper portion of the sealed tube.

5. A single acting hydraulic cylinder apparatus comprising:

an agricultural implement operated by a single acting hydraulic cylinder, wherein a hollow member is provided by a frame of the implement;

a breathing chamber provided by sealing at least a portion of the hollow member such that outside air is prevented from entering the breathing chamber;

a pressurized port of the hydraulic cylinder adapted for connection to a pressurized hydraulic fluid source;

an unpressurized breathing port of the hydraulic cylinder connected to the breathing chamber such that air can flow between the breathing port and the breathing chamber.

* * * * *